United States Patent
Barth et al.

(10) Patent No.: US 11,407,408 B2
(45) Date of Patent: Aug. 9, 2022

(54) METHOD FOR PERFORMING AN EVASIVE MANEUVER WITH A UTILITY VEHICLE COMBINATION, AND EMERGENCY EVASION SYSTEM

(71) Applicant: WABCO Europe BVBA, Brussels (BE)

(72) Inventors: Christoph Barth, Hannover (DE); Thomas Dieckmann, Pattensen (DE); Stephan Kallenbach, Hannover (DE); Ralph-Carsten Luelfing, Garbsen (DE); Klaus Plaehn, Seelze (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 597 days.

(21) Appl. No.: 16/324,914

(22) PCT Filed: Aug. 17, 2017

(86) PCT No.: PCT/EP2017/000995
§ 371 (c)(1),
(2) Date: Feb. 12, 2019

(87) PCT Pub. No.: WO2018/054517
PCT Pub. Date: Mar. 29, 2018

(65) Prior Publication Data
US 2021/0291818 A1    Sep. 23, 2021

(30) Foreign Application Priority Data

Sep. 20, 2016 (DE) .................... 10 2016 011 282.4

(51) Int. Cl.
*B60W 30/04* (2006.01)
*B60W 30/09* (2012.01)
(Continued)

(52) U.S. Cl.
CPC ............ *B60W 30/09* (2013.01); *B60W 10/18* (2013.01); *B60W 10/20* (2013.01); *B60W 30/04* (2013.01);
(Continued)

(58) Field of Classification Search
CPC .......... B60W 30/09; B60W 30/18163; B60W 10/20; B60W 30/0956; B60W 30/04;
(Continued)

(56) References Cited

U.S. PATENT DOCUMENTS 7,040,722 B2 *  5/2006  Szabo ................. B60T 8/17551
                                                        180/282
9,156,495 B2 * 10/2015  Yamashiro ....... G08G 1/096791
(Continued)

FOREIGN PATENT DOCUMENTS

CN          102874250 A        1/2013
CN          104176054 A1      12/2014
(Continued)

OTHER PUBLICATIONS

M.F.J. Juijten, "Lateral Dynamic Behaviour of Articulated Commerical Vehicles," Master's Thesis, Eindoven University, Aug. 2010, http://www.mate.tue.nl/mate/pdfs/12050.pdf (Year: 2010).*
(Continued)

*Primary Examiner* — Donald J Wallace
*Assistant Examiner* — Daniel M. Robert
(74) *Attorney, Agent, or Firm* — Leydig, Voit & Mayer, Ltd.

(57) ABSTRACT

A method for performing an evasive maneuver with a commercial vehicle-trailer combination includes ascertaining that a collision between the commercial vehicle-trailer combination and a collision object is impending. The method further includes determining an evasion trajectory by which the commercial vehicle-trailer combination can
(Continued)

evade the collision object without coming into contact with the collision object, determining a desired steering angle based on the evasion trajectory and activating an active steering system of the commercial vehicle-trailer combination in dependence on the determined desired steering angle such that the commercial vehicle-trailer combination moves along the evasion trajectory from a starting traffic lane to a target traffic lane so as to perform the evasive maneuver. The method additionally includes determining a desired vehicle deceleration and initiating an electronic braking system of the commercial vehicle-trailer combination in dependence on the desired vehicle deceleration so as to brake the commercial vehicle-trailer combination.

18 Claims, 4 Drawing Sheets

(51) Int. Cl.
    B60W 10/18      (2012.01)
    B60W 10/20      (2006.01)
    B60W 30/095     (2012.01)
    B60W 30/18      (2012.01)
(52) U.S. Cl.
    CPC .... *B60W 30/0953* (2013.01); *B60W 30/0956* (2013.01); *B60W 30/18163* (2013.01); *B60W 2300/14* (2013.01); *B60W 2520/125* (2013.01)
(58) Field of Classification Search
    CPC ............. B60W 10/18; B60W 30/0953; B60W 2520/125; B60W 2300/14
    See application file for complete search history.

(56) References Cited

U.S. PATENT DOCUMENTS

| | | | |
|---|---|---|---|
| 10,046,761 | B2 | 8/2018 | Meyer et al. |
| 10,661,769 | B2 * | 5/2020 | Czaja ................... B60T 8/176 |
| 2004/0030498 | A1 | 2/2004 | Knoop et al. |
| 2004/0119335 | A1 | 6/2004 | Szabo et al. |
| 2004/0181338 | A1 * | 9/2004 | Dobler ................... G08G 1/166 701/301 |
| 2008/0109135 | A1 * | 5/2008 | Lemmen ................ B62D 6/006 701/41 |
| 2011/0015818 | A1 * | 1/2011 | Breuer ................ B60T 8/17558 701/31.4 |
| 2011/0112723 | A1 | 5/2011 | Reich |
| 2012/0101701 | A1 * | 4/2012 | Moshchuk ............ B60W 30/09 701/70 |
| 2012/0101713 | A1 | 4/2012 | Aamrapali et al. |
| 2013/0218396 | A1 | 8/2013 | Aamrapali et al. |
| 2015/0165850 | A1 * | 6/2015 | Chiu ........................ B60D 1/62 701/41 |
| 2015/0251656 | A1 | 9/2015 | Katsuhiko et al. |
| 2015/0314782 | A1 | 11/2015 | Haeussler et al. |
| 2015/0360687 | A1 * | 12/2015 | Meyer ................... B60W 30/09 701/70 |
| 2016/0152236 | A1 | 6/2016 | Yi et al. |
| 2016/0280265 | A1 | 9/2016 | Hass et al. |
| 2017/0247032 | A1 * | 8/2017 | Lee ...................... B62D 15/025 |

FOREIGN PATENT DOCUMENTS

| | | | | |
|---|---|---|---|---|
| DE | 10046036 | A1 | | 3/2002 |
| DE | 10231556 | A1 | | 1/2003 |
| DE | 10342865 | A1 | | 4/2005 |
| DE | 102005028787 | A1 | | 5/2006 |
| DE | 102005018486 | A1 | | 11/2006 |
| DE | 102008003205 | A1 | | 7/2009 |
| DE | 102008019194 | A1 | | 10/2009 |
| DE | 102012222862 | A1 | | 6/2014 |
| DE | 102013001229 | A1 | | 7/2014 |
| DE | 102013009252 | A1 | | 12/2014 |
| DE | 102014017594 | A1 | | 6/2016 |
| DE | 102015117903 | A1 * | 4/2017 | ...... B60W 30/18036 |
| DE | 102016000306 | A1 * | 7/2017 | ............ B60W 30/02 |
| EP | 1409310 | B1 * | 4/2009 | ............ B60W 10/20 |
| EP | 2240354 | B1 | | 10/2010 |
| EP | 2268515 | A1 | | 1/2011 |
| EP | 2644464 | A1 | | 10/2013 |
| JP | 2007210594 | A | | 8/2007 |
| JP | 2009262837 | A | | 11/2009 |

OTHER PUBLICATIONS

R.D. Ervin, P.S. Fancher, and T.D. Gillespie. An overview of the dynamic performance properties of long truck combinations. Technical Report UMTRI-84-26, The University of Michigan Transportation Research Institute, Jul. 1984 (Year: 1984).*

Fancher ref. continued: https://citeseerx.ist.psu.edu/viewdoc/download?doi=10.1.1,872.4695&rep=rep1&type=pdf (Year: 1984).*

Patrick James McNaull, "Modeling and Validation of a Heavy Truck Model with Electronic Stability Control," Master's Thesis, Ohio State University, 2009, http://rave.ohiolink.edu/etdc/view?acc_num=osu1250534058 (Year: 2009).*

* cited by examiner

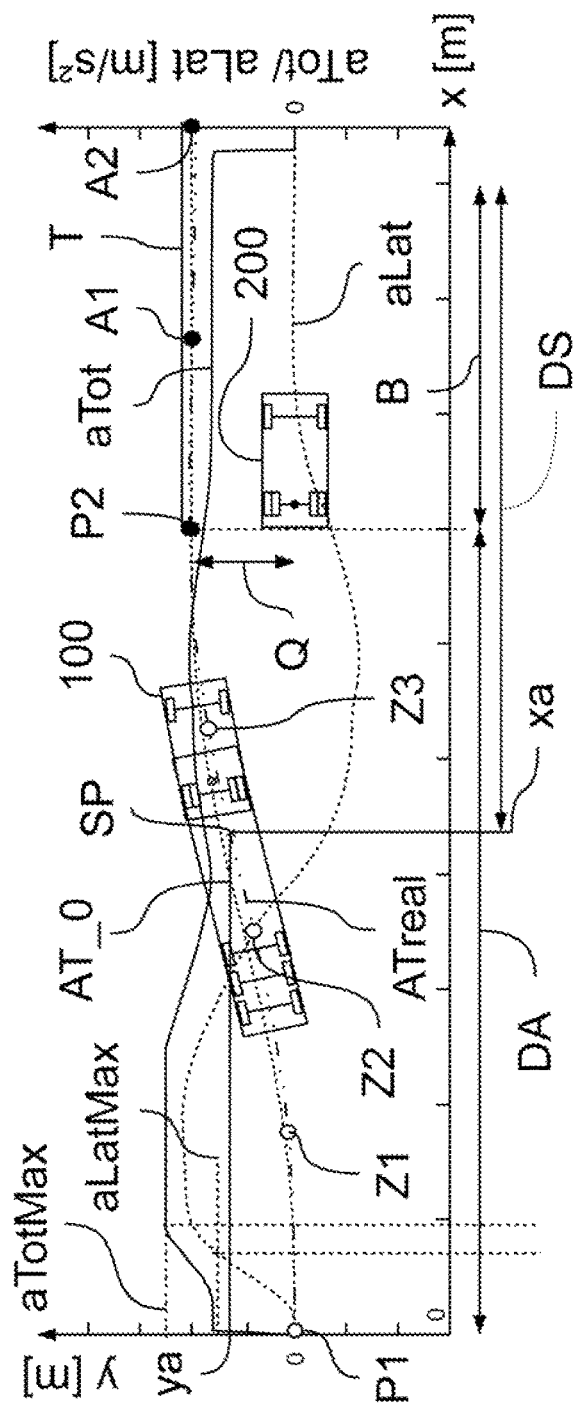
Fig. 2a
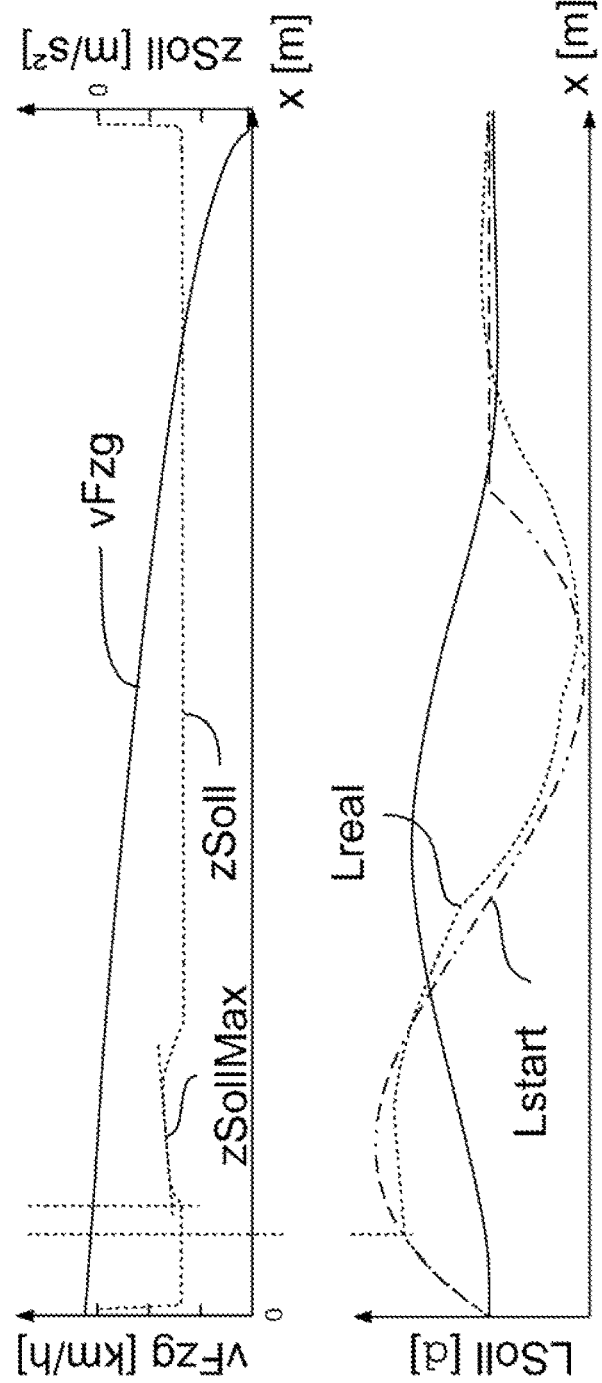
Fig. 2b
Fig. 2c

METHOD FOR PERFORMING AN EVASIVE MANEUVER WITH A UTILITY VEHICLE COMBINATION, AND EMERGENCY EVASION SYSTEM

CROSS REFERENCE TO RELATED APPLICATIONS

This application is a U.S. National Stage Application under 35 U.S.C. § 371 of International Application No. PCT/EP2017/000995 filed on Aug. 17, 2017, and claims benefit to German Patent Application No. DE 10 2016 011 282.4 filed on Sep. 20, 2016. The International Application was published in German on Mar. 29, 2018, as WO 2018/054517 A1 under PCT Article 21(2).

FIELD

The invention relates to a method for performing an evasive maneuver with a commercial vehicle-trailer combination, and an emergency evasion system.

BACKGROUND

Emergency braking systems (AEBS) are used in commercial vehicle-trailer combinations for the purpose of initiating a braking procedure of the vehicle-trailer combination with the correspondingly selected desired vehicle deceleration after an impending collision with a collision object is detected. It is thereby intended to bring the vehicle-trailer combination to a standstill prior to the vehicle reaching the collision object, with the result that the probability of persons being injured is kept low. Moreover, the vehicle-trailer combination is then braked in such a manner that further collisions are avoided.

Emergency braking systems of this type are designed with the concept that the emergency braking procedure is performed in the case of high coefficients of friction, in other words on a dry road surface. If the current coefficients of friction are low, it may be necessary to perform an additional steering maneuver in order to additionally evade the collision object and thereby to avoid a crash.

EP 2 240 354 describes a method for avoiding a collision, wherein it is provided after an impending collision is detected to actuate in particular a braking system using control signals in order to avoid a collision. If it is no longer possible to avoid a collision by means of a braking procedure, an automated evasive maneuver may be performed by means of actively intervening in the steering procedure.

In so doing, this method is encumbered by the disadvantage that the stability of the vehicle-trailer combination is not taken into consideration when performing the automated evasive maneuver.

In accordance with EP 2 268 515, a stability control procedure is provided for a commercial vehicle, wherein an actual yawing behavior that is used to prevent said commercial vehicle from tipping over is determined from a measured lateral acceleration and a desired yawing behavior is determined from a current steering angle in order to avoid having to use an additional yaw rate sensor.

EP 2 644 464 discloses a stability control procedure for a commercial vehicle-trailer combination, wherein said control procedure determines an oscillating movement of the vehicle-trailer combination, said movement being caused as a result of the vehicle-trailer combination swerving from side to side, and in the event of an oscillating movement being established said stability control procedure performs a braking control procedure and also limits an engine torque.

DE 10 2005 018 486 describes a method for assisting the driver during an evasive maneuver, wherein for this purpose an evasion trajectory is determined, along which the vehicle is to be moved for the evasive maneuver. If the vehicle deviates from this evasion trajectory, a yawing moment that counteracts the deviation of the vehicle is generated at the wheels, for example by means of braking individual wheels, with the result that the vehicle may be moved back in the direction of the evasion trajectory and it is possible to drive along said trajectory.

In accordance with DE 103 42 865 A1, in the event of the vehicle-trailer combination swerving from side to side, it is provided to intervene in the steering procedure independently of the driver and also to reduce the drive torque of the vehicle-trailer combination if an actual yaw rate deviates from a desired yaw rate in order to stabilize the vehicle-trailer combination.

DE 10 2005 028 787 also discloses a system for stabilizing a vehicle-trailer combination. In this case, in the event that a critical trailer oscillation is detected, it is provided to intervene in the steering procedure in an automated manner.

DE 10 2012 22 862 likewise discloses a method for stabilizing a vehicle-trailer combination, wherein, in the event that a swerving movement is detected, it is provided to intervene in the steering procedure independently of the driver in the event that a first threshold value is exceeded by a swerve variable that characterizes the swerving movement. Furthermore, in the event that a second threshold value that is higher than the first threshold value is exceeded, it is also possible to intervene in the braking procedure.

SUMMARY

In an embodiment, the present invention provides a method for performing an evasive maneuver with a commercial vehicle-trailer combination. The method includes ascertaining that a collision between the commercial vehicle-trailer combination and a collision object is impending, wherein the collision object is spaced apart from the commercial vehicle-trailer combination by an evasion distance. The method further includes determining an evasion trajectory by which the commercial vehicle-trailer combination can evade the collision object without coming into contact with the collision object; determining a desired steering angle based on the evasion trajectory and activating an active steering system of the commercial vehicle-trailer combination in dependence on the determined desired steering angle such that the commercial vehicle-trailer combination moves along the evasion trajectory from a starting traffic lane to a target traffic lane so as to perform the evasive maneuver; and determining a desired vehicle deceleration and initiating an electronic braking system of the commercial vehicle-trailer combination in dependence on the desired vehicle deceleration so as to brake the commercial vehicle-trailer combination while the evasive maneuver is being performed. While the evasive maneuver is being performed, a lateral acceleration of the commercial vehicle-trailer combination is determined. The desired steering angle is limited in the event that the lateral acceleration achieves or exceeds a maximum lateral acceleration in order to prevent the vehicle-trailer combination from tipping over, and/or the desired vehicle deceleration is limited to a maximum desired vehicle deceleration in the event that a total acceleration of the commercial vehicle-trailer combination achieves or exceeds a maximum total acceleration in order to prevent loss of directional stability or to prevent the commercial vehicle-trailer combination from swerving.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 2a, b, c illustrate an exemplary illustration of an evasive maneuver; and

DETAILED DESCRIPTION

Figure 1:
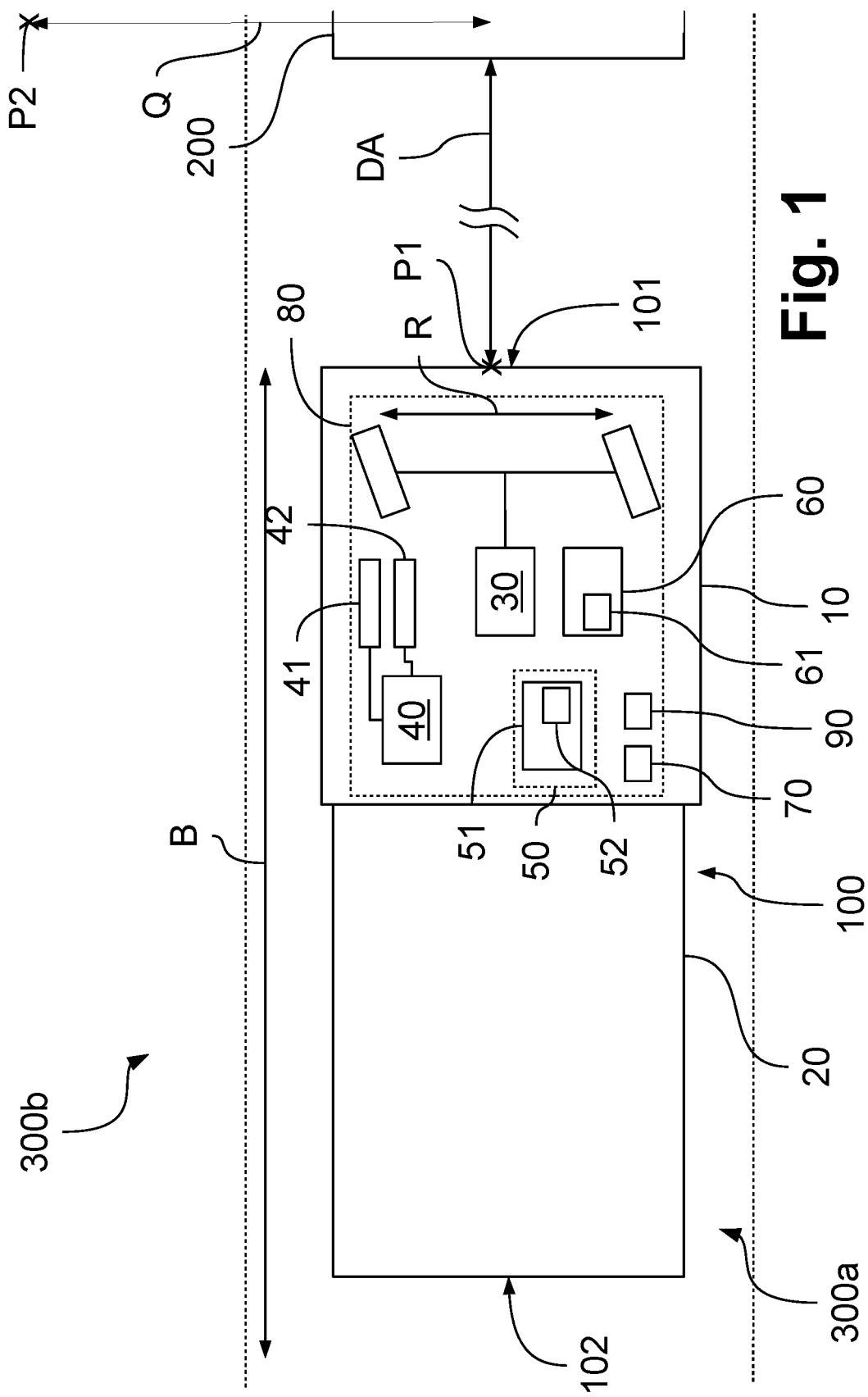
FIG. 1 illustrates a schematic view of a commercial vehicle-trailer combination having an emergency evasion system.

Embodiments of the invention provide methods for performing an evasive maneuver with a commercial vehicle-trailer combination, such methods rendering it possible even in the case of low coefficients of friction to reliably and safely avoid an impending collision whilst simultaneously maintaining the vehicle stability of the commercial vehicle-trailer combination so as to prevent secondary accident consequences. Furthermore, embodiments of the invention provide emergency evasion systems.

It is accordingly provided in accordance with embodiments of the invention, after an impending collision of a commercial vehicle-trailer combination with a collision object is detected and after an evasion trajectory has been determined along which the commercial vehicle-trailer combination is moved in an automated manner, in order to evade the collision object in an evasive maneuver to determine a current lateral acceleration of the commercial vehicle-trailer combination and in dependence thereon to limit a desired steering angle and/or as required also to limit a desired vehicle deceleration in the event that the current lateral acceleration exceeds a maximum lateral acceleration and/or the desired vehicle deceleration exceeds a maximum desired vehicle deceleration that is preferably dependent upon the maximum lateral acceleration.

The term "automated movement of the vehicle-trailer combination along the evasion trajectory" is understood in this case to mean that active intervention is performed in the steering procedure and in the braking procedure, in that the desired steering angle and the desired vehicle deceleration are specified in an automated manner in order to follow the determined evasion trajectory. As a result, the vehicle-trailer combination is moved from a starting traffic lane, on which the vehicle-trailer combination is located prior to the evasive maneuver, to a target traffic lane that is specified as the traffic lane for bringing the vehicle-trailer combination to a standstill.

As a result, it is advantageously already possible to achieve that the evasive maneuver is performed in addition whilst taking into consideration stability requirements, with the result that it is possible during the evasive maneuver to prevent the vehicle-trailer combination from starting to tip over as a result of an excessively large desired steering angle or to prevent loss of directional stability in the event that a traction limit is exceeded as a result of an excessively high desired vehicle deceleration and consequently to prevent the vehicle swerving as a result of under-control or over-control of the towing vehicle or to prevent the trailer swerving or rather jack-knifing.

It is advantageously possible in this manner after a collision is detected not only to prevent the primary impending crash but rather also to prevent any resultant secondary accident consequences.

In this case, an initial evasion trajectory is first of all determined as the evasion trajectory at the start of the evasive maneuver and updated evasion trajectories are determined periodically during the evasive maneuver if the vehicle-trailer combination reaches previously defined intermediate points. In this case, the updated evasion trajectory advantageously compensates for deviations from the initial evasion trajectory that occur in particular as a result of the limitation of the desired steering angle.

It is preferred that the evasion trajectories are determined in each case on the basis of a fifth degree polynomial in dependence upon boundary conditions, wherein the boundary conditions are established in such a manner that whilst traveling along the respective evasion trajectory over an evasion distance the commercial vehicle-trailer combination evades the collision object without in so doing coming into contact with the collision object, in other words after achieving the evasion distance at least one lateral offset is maintained adjacent to the collision object if the commercial vehicle-trailer combination is located on the target traffic lane.

In this case, the evasion distance indicates the distance between the collision object and the commercial vehicle-trailer combination once the evasive maneuver has been triggered, in other words from the point in time after which an emergency braking system (AEBS) outputs a warning of an impending collision. The lateral offset is oriented in a perpendicular manner thereto. In this case, it is possible to adopt a Cartesian coordinate system in which the evasion distance is plotted in the x-direction or rather on the x-axis that is orientated by way of example parallel to the starting traffic lane or to the target traffic lane, and in which the lateral offset is plotted in the y-direction or rather on the y-axis. A vehicle-x-position is consequently indicated by the x-coordinate and a vehicle-y-position is indicated by the y-coordinate in this Cartesian coordinate system.

As a consequence, it is possible to reliably avoid a collision, wherein by means of the additional steering maneuver even in the case of low coefficients of friction of by way of example $\mu<=0.5$, in other words in particular on a wet road surface, it is possible to prevent a crash.

The desired steering angle for the automated steering specification is constantly determined in time intervals and results preferably from a second derivative of the function of the in each case last-determined evasion trajectory at the current vehicle-x-position, in other words from a curve of the respective evasion trajectory in the event that the lateral acceleration does not exceed the maximum lateral acceleration. However, if the maximum lateral acceleration is exceeded, the desired steering angle is limited, wherein for this purpose the desired steering angle is selected proportional to the maximum lateral acceleration and/or conversely proportional to the current vehicle velocity.

Furthermore, it is also preferred that the current lateral acceleration is determined from the second derivative of the function of the respective evasion trajectory at the current vehicle-x-position.

It is preferred so as to determine the desired steering angle and the lateral acceleration that the current vehicle-x-position is determined by means of odometry, in other words the previous vehicle-x-position valid prior to a time interval is used and on the basis of the movement of the vehicle-trailer combination it is estimated at which vehicle-x-position the vehicle-trailer combination is located at the current point in time. For this purpose, in particular reference is made to data from a stability control system (ESC) that determines a current yaw rate of the vehicle-trailer combination at the center of gravity. It is possible from this to determine a current yaw angle using an integration method. It is concluded from the current yaw angle and a current vehicle velocity in which direction and how far the vehicle-trailer combination has moved from the previous vehicle-x-position. The current vehicle-x-position is derived therefrom.

It is consequently advantageously possible without an additional position sensor, by way of example a satellite navigation system, in particular a GPS, to determine the current vehicle-x-position from information that is in any case measured in the vehicle-trailer combination. In addition, the current yaw rate and the current vehicle velocity may be determined with a very high degree of accuracy and rapidity and a procedure of determining the position is not influenced by the environment of the vehicle-trailer combination, for example traveling through a tunnel in the case of a GPS. It is merely possible as an addition, if available, to use data from a satellite navigation system to perform a plausibility check.

In order to compensate for the limitation of the desired steering angle in the event that the maximum lateral acceleration is exceeded, which would otherwise lead to the vehicle departing from the initial evasion trajectory, the updated evasion trajectory is calculated as described above at the intermediate points whilst the evasive maneuver is being performed. After the intermediate point, the desired steering angle and also the lateral acceleration is then determined on the basis of the updated evasion trajectory or rather on the basis of its second derivative at the current vehicle-x-position.

As a result, it is advantageously possible to achieve that during the evasive maneuver a precise calculation of the desired steering angle and of the current lateral acceleration may be repeated after the intermediate point. The reliability and safety of the evasive maneuver increase.

The intermediate point, the coordinates of which are determined by means of odometry, and an evasion point associated therewith are established as boundary conditions for the updated evasion trajectory and the orientation of the vehicle is taken into consideration at these points. For this purpose, the evasion point may be displaced rearward in the x-direction by way of example in such a manner with respect to the intermediate point in the direction of travel of the commercial vehicle-trailer combination that the distance between the intermediate point and the evasion point corresponds to the evasion distance.

By virtue of displacing the evasion point so as to calculate the updated evasion trajectory, it is advantageously achieved that numerically-based large steering dynamics do not occur if the vehicle-trailer combination moves into the region of the respective evasion point. This may then occur by way of example if the vehicle-trailer combination has achieved the evasion distance and the vehicle-trailer combination at this point is not precisely located on a previously established end point. In this case, a higher desired steering angle is calculated on a numerical basis in order nonetheless to achieve this. This is to be avoided by selecting an evasion point that is displaced rearward in the direction of travel of the commercial vehicle-trailer combination.

The displacement of the evasion point or rather of the evasion points may be selected in addition in such a manner that the updated evasion trajectory that is derived from the respective intermediate point and the evasion point deviates from the initial evasion trajectory by less than one tolerance and the updated evasion trajectory deviates starting from the initial evasion trajectory merely in the y-direction away from the collision object in the direction of the target traffic lane.

As a result, it is advantageously possible to avoid that the vehicle-trailer combination on account of the new calculation moves too close to the collision object shortly before or during the passing maneuver. In addition, as a result, after passing the collision object the vehicle-trailer combination may be oriented more rapidly into a straight position, in other words parallel to the target traffic lane.

It is possible to select between three and twenty intermediate points or rather new calculations whilst the evasive maneuver is being performed. As a result, it is possible to determine the desired steering angle and the current lateral acceleration in a very precise manner.

After reaching the collision object, in other words after traveling to the end of the evasion distance, and after reaching the target traffic lane, it is also still possible to determine further updated evasion trajectories, wherein after achieving the evasion distance the evasion point is maintained and no longer displaced in the x-direction. It is possible by means of these new calculations to achieve that the vehicle-trailer combination is oriented parallel to the target traffic lane by means of further steering movements.

It is preferred that the maximum lateral acceleration so as to limit the desired steering angle is determined from a tipping-over limit, wherein the tipping-over limit is specified by a device in the commercial vehicle-trailer combination for preventing said vehicle-trailer combination from tipping over, said device being part of the stability control system. The tipping-over limit may be by way of example constant, for example 3 m/s$^2$, or depending upon the vehicle may be determined by the device for preventing the vehicle-trailer combination from tipping over, wherein it is possible by way of example to take into consideration the loading of the vehicle-trailer combination and the vehicle velocity.

It is preferred that, so as to brake the commercial vehicle-trailer combination, the desired vehicle deceleration during the evasive maneuver is selected in such a manner that the vehicle-trailer combination with a trailer combination rear side is brought to a standstill in the direction of travel after the evasion distance. As a result, it is advantageously achieved that the commercial vehicle-trailer combination creates space in the starting traffic lane for the following traffic and does not protrude rearward of the collision object and/or in so doing does not occupy multiple traffic lanes. In this case, the electronic braking system of the commercial vehicle-trailer combination is actuated in such a manner that the commercial vehicle-trailer combination from the start of the evasive maneuver comes to a standstill at the earliest after the evasion distance plus a length of the vehicle-trailer combination.

In this case, the desired vehicle deceleration that is specified to the electronic braking system is limited in such a manner that a total acceleration of the vehicle-trailer combination, which is derived from a vectorial sum of the longitudinal acceleration, in other words the desired vehicle deceleration, and the lateral acceleration, does not exceed a maximum total acceleration. This may be achieved by way of example by means of measuring the total acceleration and comparing the result with the maximum total acceleration. If the maximum total acceleration is achieved or exceeded, the requested desired vehicle deceleration is limited to the maximum desired vehicle deceleration. In this case, the maximum desired vehicle deceleration is preferably established in dependence upon the maximum total acceleration, which is preferably dependent upon a coefficient of friction, in particular μ<=0.5, in other words for wet road surfaces, and upon the current lateral acceleration.

Alternatively, it is also possible to monitor the requested desired vehicle deceleration directly in such a manner that only requests for desired vehicle decelerations that are smaller than or equal to the maximum desired vehicle deceleration, which is dependent upon the maximum total acceleration, may be made to the electronic braking system. A request for a greater desired vehicle deceleration is consequently prevented from the start.

As a result, it is advantageously achieved that a desired vehicle deceleration may then only be requested from the electronic braking system if the maximum total acceleration is not already achieved or exceeded by means of the lateral acceleration that is produced on account of the requested steering procedure with the desired steering angle. The magnitude of the desired vehicle deceleration that may be requested is consequently varied according to how high the total acceleration of the vehicle-trailer combination is already on account of the steering request.

As a result, the steering procedure is advantageously awarded a higher priority than the braking procedure. In other words, the evasive maneuver is performed under the proviso that the primary objective is to evade the collision object and bringing the vehicle to a standstill is only to be the secondary objective in order in particular to ensure that the commercial vehicle-trailer combination does not occupy multiple traffic lanes and thereby disrupt the following traffic, in particular in the starting traffic lane.

FIG. 1 illustrates a commercial vehicle-trailer combination 100 having a towing machine as the towing vehicle 10 and a semitrailer as the trailer 20. Alternatively, the commercial vehicle-trailer combination 100 may also be configured as a truck having a drawbar trailer. The towing vehicle 10 of the commercial vehicle-trailer combination 100 is provided with an active steering system 30 that is configured so as to steer the commercial vehicle-trailer combination 100 in an automated manner, an emergency braking system 40 (AEBS) that is configured to detect an impending collision K with a collision object 200 in front of the relevant commercial vehicle-trailer combination 100, for example with the aid of a camera 41 and/or a radar 42, and also provided is a stability control system 50 (ESC), which monitors and controls the driving dynamics of the commercial vehicle-trailer combination 100 via an ESC-control unit 51. The ESC-control unit 51 is provided in particular with a device 52 (RSC) for preventing the vehicle-trailer combination from tipping over, said device being able by means of intervening in the drive and braking system 60 to reduce the probability of the commercial vehicle-trailer combination 100 tipping over.

Furthermore, the commercial vehicle-trailer combination 100 comprises an electronic braking system 60 (EBS), with which it is possible when controlled by an EBS control unit 61 to perform an automated braking procedure of the commercial vehicle-trailer combination 100 if a specific desired vehicle deceleration zSoll is requested. The desired vehicle deceleration zSoll is requested in accordance with the embodiment in accordance with the invention in particular by an emergency evasion control unit 70 that is configured in the event of an impending collision K with the collision object 200 being detected to evade said collision object, in that a desired steering angle LSoll is requested via the active steering system 30 and simultaneously a desired vehicle deceleration zSoll is specified.

The active steering system 30, the emergency braking system 40, the stability control system 50 and the electronic braking system 60 consequently form an emergency evasion system 80 that is controlled by the emergency evasion control unit 70 and that may reduce the accident consequences in the event of an impending collision K in that a combined steering and braking procedure is requested.

In order to perform the combined steering and braking procedure, after an impending collision K is detected the emergency evasion control unit 70 first of all calculates an initial evasion trajectory AT_0, along which the commercial vehicle-trailer combination 100 is to be guided from a starting traffic lane 300a to a target traffic lane 300b in order to evade the collision object 200 in an evasive maneuver AWM. An exemplary initial evasion trajectory AT_0 is illustrated in FIG. 2a as a finely dashed line.

For this purpose, a starting point P1 on the starting traffic lane 300a is selected, which indicates the position of the trailer combination front side 101 of the relevant commercial vehicle-trailer combination 100 at the current point in time. The starting point P1 is placed by way of example in the origin of a Cartesian coordinate system with x- and y-coordinates, wherein the x-axis represents the longitudinal direction and the y-axis represents the lateral direction with respect to the traffic lanes 300a, 300b.

Furthermore, an evasion distance DA from the starting point P1 to the collision object 200 is determined, by way of example by the emergency braking system 40, wherein the evasion distance DA indicates from which point the emergency braking system 40 identifies a driving situation as critical, in other words an impending collision K is detected and an evasive maneuver AWM is initiated, wherein this evasion distance DA is between 30 m and 40 m in order to render it possible to safely evade the collision by means of a steering procedure and a braking procedure.

Moreover, a lateral offset Q is determined that indicates the desired distance between the relevant commercial vehicle-trailer combination 100 and the collision object 200 after the evasive maneuver. The evasion distance DA and the lateral offset Q establish an end point P2 on the target traffic lane 300b with which the initial evasion trajectory AT_0 is calculated at the start of the evasive maneuver AWM.

In order to calculate the initial evasion trajectory AT_0, a fifth degree polynomial is used, in other words a function $f(x)$ with a first derivative $f1(x)$ and with a second derivative $f2(x)$:

$$f(x)=c5*x^5+c4*x^4+c3*x^3+c2*x^2+c1*x+c0$$

$$f1(x)=5*c5*x^4+4*c4*x^3+3*c3*x^3+2*c2*x+c1$$

$$f2(x)=20*c5*x^3+12*c4*x^2+6*c3*x+2*c2$$

wherein $f(x)$ represents the y-coordinate and x represents the x-coordinate and ci represents coefficients of the fifth degree polynomial, which establish the precise progression of the initial evasion trajectory AT_0 in particular between the start point P1 and the end point P2.

In order to determine the coefficients ci, the prevailing boundary conditions are used, in other words $f(0)=0$ for P1 and $f(DA)=Q$ for P2. Furthermore, it is assumed that the commercial vehicle-trailer combination 100 is traveling in a straight line at the start point P1 and at the end point P2, in other words f1(0)=0 for P1 and f1(DA)=0 for P2. Furthermore, it is assumed that the curve of the initial evasion trajectory AT_0 is likewise zero at the start point P1 and at end point P2, in other words f2(0)=0 for P1 and f2(DA)=0 for P2.

It is possible under these boundary conditions to unambiguously determine the coefficients ci by triggering a linear system of equations, whereby the initial evasion trajectory AT_0 is established between the start point P1 and the end point P2.

Once the initial evasion trajectory AT_0 has been calculated, it is to be determined which desired steering angle LSoll to send to the active steering system 30 after each time interval dt in order to follow the initial evasion trajectory AT_0. This is performed at the start of the evasive maneuver with reference to the initial evasion trajectory AT_0, for which the desired steering angle LSoll is obtained from:

$$LSoll = vFzg * f2(xa) * LRatio * fStat,$$

wherein vFzg represents a current vehicle velocity at the center of gravity SP, f2(xa) represents the second derivation of the initial evasion trajectory AT_0 at a current vehicle-x-position xa of the commercial vehicle-trailer combination 100, in other words a curve of the initial evasion trajectory AT_0 at the point xa, LRatio represents a total steering ratio of the commercial vehicle-trailer combination 100 and fStat represents a stationary transmission function of the yawing behavior of the commercial vehicle-trailer combination 100, which is determined from a wheel track width R, from the current vehicle velocity vFzg and also from a self-steering gradient LGrad.

The current vehicle-x-position xa is determined in this case by means of odometry from a previous vehicle-x-position xb valid prior to a time interval dt, from a current yaw angle YawAng_a of the relevant commercial vehicle-trailer combination 100 and from the current vehicle velocity vFzg:

$$xa = xb + vFzg * \cos(YawAng\_a) * dt.$$

The current yaw angle YawAng_a is obtained in turn from a current yaw rate YawRate, which is measured by way of example by the stability control system 50, from:

$$YawAng\_a = YawAng\_b + YawRate * dt,$$

wherein YawAng_b represents a previous yaw angle valid prior to a time interval dt.

In other words, so as to determine the current vehicle-x-position xa, additional sensors are not used to determine the position but rather reference is made only to variables that are already determined by way of example by the stability control system 50 and are made available to the emergency evasion control device 70 of the emergency evasion system 80. However, so as to perform a plausibility check, it is also possible to refer to data from a satellite navigation system 90, by way of example a GPS, in order to determine the current vehicle-x-position xa.

An exemplary steering angle progression LStart, which is determined at the start of the evasive maneuver AWM with reference to the initial evasion trajectory ATstart and indicates the desired steering angle LSoll at the corresponding x-positions of the vehicle-trailer combination 100, is illustrated in FIG. 2c as a dot-dash line. This steering angle progression LStart is assumed at the start of an evasive maneuver AWM.

In order during the progression of the evasive maneuver AWM to ensure that the evasive maneuver AWM does not induce any other accidents, the initial calculation of the desired steering angle LSoll is to be corrected in accordance with the steering angle progression LStart during the evasive maneuver AWM and furthermore the desired vehicle deceleration zSoll is also to be established, said desired vehicle deceleration is to ensure simultaneously that the commercial vehicle-trailer combination 100 is braked during the evasive maneuver AWM.

It is intended in this manner that not only is the primary impending crash prevented but secondary accidents, such as the vehicle-trailer combination 100 tipping over or becoming unstable or jack-knifing, are also prevented.

The desired steering angle LSoll is corrected in this case in dependence upon a current lateral acceleration aLat of the commercial vehicle-trailer combination 100, in other words in dependence upon acceleration that acts in a perpendicular manner with respect to the direction of movement of the center of gravity SP.

This is determined in this case from the second derivation f2(xa) at the current vehicle-x-position xa:

$$aLat = vFzg^2 * f2(xa).$$

In other words, during the procedure of determining the current lateral acceleration aLat, reference is also made to variables that may already be determined by way of example by the stability control system 50 and may be provided to the emergency evasion control unit 70 of the emergency evasion system 80.

The limitation of the lateral deceleration aLat is used so as to maintain a specified tipping-over limit KG of by way of example 3 m/s$^2$, beyond which limit commercial vehicle-trailer combinations 100 which have the center of gravity SP in a high position may tip over. This tipping-over limit KG is already taken into consideration in the device 52 for preventing the vehicle-trailer combination from tipping over and on the basis of the tipping-over limit KG for the relevant commercial vehicle-trailer combination 100 the ESC control unit 51 outputs a maximum lateral acceleration aLatMax that is vehicle-dependent and velocity-dependent, the tipping-over limit KG being maintained for this procedure.

It is assumed in this case that the maximum lateral acceleration aLatMax that is determined by the device 52 for preventing the vehicle-trailer combination from tipping over represents a reliable value for the current driving behavior of the relevant commercial vehicle-trailer combination 100 and this value of the maximum lateral acceleration aLatMax is therefore also the basis for the following calculations for the evasive maneuver AWM. Alternatively, however, it is also possible to provide a procedure for adjusting the maximum lateral acceleration aLatMax in order to take into consideration that as the dynamic evasive maneuver AWM is performed the lateral acceleration aLat does not build up so quickly and the desired steering angle LSoll is not to be reduced unnecessarily.

In order during the evasive maneuver AWM to ensure that the tipping-over limit KG is not exceeded, as soon as the above determined current lateral acceleration aLat exceeds the maximum lateral acceleration aLatMax the desired steering angle LSoll is limited to:

$$LSoll = sgn(aLat) * aLatMax * LRatio * fstat / vFzg.$$

The procedure of limiting the desired steering angle LSoll results in the commercial vehicle-trailer combination 100 no longer following the evasion trajectory AT_0 (cf. FIG. 2a). On the contrary, during the entire evasive maneuver AWM, the commercial vehicle-trailer combination 100 follows an actual evasion trajectory ATreal that is produced by means of an actual steering angle progression (cf. FIG. 2c).

In order to take this condition into consideration, new calculations of the evasion trajectory are performed for the evasive maneuver AWM at specific points in time Zi, with i=1, . . . , N, in other words periodically updated evasive maneuvers AT_i are determined with i=1, . . . , N, wherein in each case the last calculated evasion trajectory AT_i is used as a calculation basis for calculating the desired steering angle LSoll and the current lateral acceleration.

So as to determine the respective updated evasion trajectory AT_i, a procedure similar to the procedure of determining the initial evasion trajectory AT_0 is performed, except that in this case the calculation is performed with boundary conditions that have changed in comparison to those at the start of the evasive maneuver AWM. Accordingly the start point P1 is no longer used as the boundary condition but rather the driving situation at the respective intermediate point Zi is taken into consideration. For this purpose, the current vehicle-x-position xa and a current vehicle-y-position ya is calculated from $$xa=xb+vFzg*\cos(YawAng\_a)*dt$$

$$ya=yb+vFzg*\sin(YawAng\_a)*dt$$

wherein yb represents the previous vehicle-y-position valid prior to the time interval and the yaw angle YawAng_a, as already described above, is calculated using an integration method from the yaw rate YawRate.

Consequently, this produces for the respective intermediate point Zi the boundary conditions for the new start point Zi of the updated evasion trajectory AT_i to f(xa)=ya and f1(xa)=tan(YawAng_a), since the vehicle-trailer combination 100 has changed its orientation, and finally f2(xa)=f2(xb) from the previous evasion trajectory AT_(i−1) in order to ensure a continuous curve transition.

The original end point P2 is displaced for the new calculation in the x-direction rearward toward an evasion point Ai in order to avoid numerically-based large steering dynamics in the region of the collision object 200 at the original end point P2. For this purpose, in accordance with this embodiment, the lateral offset Q with respect to the collision object 200 is maintained, in other words the y-coordinate of the end point P2 is assumed for the evasion point Ai, and the x-coordinate of the original end point P2 is displaced rearward in the direction of travel of the commercial vehicle-trailer combination 100 in such a manner that the evasion distance DA between the respective intermediate point Zi and the current evasion point Ai is maintained. By way of example, this is illustrated for the first two evasion points A1, A2 in FIG. 2a. Accordingly, only the x-coordinates for these evasion points Ai change as the boundary conditions for defining the fifth degree polynomial, in other words the function f(x) of the updated evasion trajectory AT_i. Alternatively, the x-coordinate of the respective evasion point Ai may however also be displaced rearward by a different amount, by way of example in each case by a specific factor f of the evasion distance DA, in other words by a fraction or by a multiple of the evasion distance DA.

By way of example, prior to reaching the collision object 200, three new calculations are provided in accordance with the embodiment in FIG. 2a, in other words i=1, 2, 3, in other words there are three intermediate points Z1, Z2, Z3 after which in each case a new updated evasion trajectory AT_1, AT_2, AT_3 is used for calculating the desired steering angle LSoll and also for calculating the current lateral acceleration aLat. However, considerably more new calculations may also be performed in order to safely evade the collision object 200 despite a possibly reduced desired steering angle LSoll.

If the commercial vehicle-trailer combination 100 reaches the original end point P2, further new calculations may be performed in order to draw the commercial vehicle-trailer combination 100 into a straight line, in other words in order to orient said commercial vehicle-trailer combination parallel to the collision object 200 or to the target traffic lane 300b. In the case of these new calculations, only the respective intermediate point Zi is displaced to the current position of the commercial vehicle-trailer combination 100. The respective evasion point Ai is maintained after said commercial vehicle-trailer combination has reached the end point P2.

During the procedure of performing the new calculation of the updated evasion trajectory AT_i, the evasion points Ai are preferably selected in such a manner that on the one hand the updated evasion trajectory AT_i for the x-values greater than the evasion distance DA deviates from the originally requested lateral offset Q no more than by a tolerance T in order not to leave the target traffic lane 300b and on the other hand a numerically-based large desired steering angle LSoll does not occur adjacent to the collision object 200.

In addition, the updated evasion trajectory AT_i is designed in such a manner that for x-values greater than the evasion distance DA, said updated evasion trajectory starting from the initial evasion trajectory AT_0 does not deviate from the initial evasion trajectory AT_0 in the direction toward the collision object 200, with the result that the commercial vehicle-trailer combination 100 maintains the lateral offset Q in any case if after achieving the evasion distance DA said commercial vehicle-trailer combination is located on the target traffic lane 300b. Therefore in accordance with FIG. 2a, the tolerance T is also only plotted upward, in other words is plotted with respect to the higher y-values.

Furthermore, In order to achieve that the commercial vehicle-trailer combination 100 does not disturb the following traffic after the evasive maneuver AWM, the emergency evasion control unit 70 specifies a desired vehicle deceleration zSoll which is used to brake the commercial vehicle-trailer combination 100 along the initial evasion trajectory AT_0 or along the updated evasion trajectory AT_i in such a manner that the commercial vehicle-trailer combination 100 including a vehicle-trailer rear side 102 is brought to a standstill after achieving the evasion distance DA or rather behind the end point P2 on the target traffic lane 300b.

Together with establishing the updated evasion trajectory AT_i after reaching the original end point P2, this results in the commercial vehicle-trailer combination 100 being brought to a standstill approx. parallel to the target traffic lane 300b and in so doing including the vehicle-trailer rear side 102 does not assume any x-values that are less than the evasion distance DA with the result that it is possible to create space for the following traffic and the commercial vehicle-trailer combination 100 is no longer distributed across multiple traffic lanes 300a, 300b. After the end point P2, small steering maneuvers may still be performed in each case depending upon the vehicle velocity vFzg in order to draw the vehicle-trailer combination 100 to a standstill.

In order to achieve this, the emergency evasion control unit 70 first of all makes a request to the electronic braking system 60 for a desired vehicle deceleration zSoll, on the basis of which the commercial vehicle-trailer combination 100 achieves a vehicle velocity vFzg of zero after the current vehicle-x-position after a distance to standstill DS, wherein $$DS=DA+B-xa,$$

and wherein B represents a length of the commercial vehicle-trailer combination 100 and xa is determined as described above by way of example by means of odometry during the evasive maneuver AWM. The length B of the vehicle-trailer combination may be specified according to the commercial vehicle-trailer combination 100 or rather the according to the emergency evasion control unit 70. FIG. 2a illustrates the distance to standstill DS for the current vehicle-x-position xa of the commercial vehicle-trailer combination 100.

Hence, the requested desired vehicle deceleration zSoll is obtained from:

$$zSoll=0.5*vFzg^2/DS,$$

with the result that the desired vehicle deceleration zSoll is continuously adjusted to the current vehicle-x-position xa and the current vehicle velocity vFzg in dependence upon the distance to standstill DS.

In order by means of the requested desired vehicle deceleration zSoll not to create any further instabilities of the commercial vehicle-trailer combination 100, by way of example a loss of directional stability in the event that a wheel-traction adhesion limit is exceeded, and thus to prevent said commercial vehicle-trailer combination 100 swerving as a result of the towing vehicle 10 being understeered or over-steered or the trailer 20 of the commercial vehicle-trailer combination 100 swerving or jack-knifing, a total acceleration aTot of the center of gravity SP of the commercial vehicle-trailer combination 100 is limited to a maximum total acceleration aTotMax.

This maximum total acceleration aTotMax represents a coefficient of friction-dependent limit value that is obtained from aTotMax=mue*g, wherein g represents the gravitational constant, in other words 9.81 m/s$^2$, and mue represents a coefficient of friction, which assuming a wet road surface amounts to approx. 0.5 or which is calculated from other control functions for the relevant commercial vehicle-trailer combination 100 and is transmitted to the emergency evasion control unit 70 in order to calculate the maximum total acceleration aTotMax.

Using this maximum total acceleration aTotMax and the above equation, a maximum desired vehicle deceleration zSollmax is obtained of:

$$zSollmax=sqrt[aTotMax^2-aLat^2],$$

wherein the lateral acceleration aLat as described above is obtained from:

$$aLat=vFzg^2*f2(xa).$$

As is evident in FIG. 2a and FIG. 2b, as soon as the total acceleration aTot exceeds the maximum total acceleration aTotMax, the desired vehicle deceleration zSoll is limited to the maximum desired vehicle deceleration zSollmax which in this case slightly increases since the lateral acceleration aLat also slightly changes at this point in time. As a result, the total acceleration aTot does not increase further.

In other words, the vehicle-trailer combination 100 is braked to a lesser extent during the evasive maneuver AWM when turning in, in order to avoid loss of directional stability. If necessary, this may also lead to the desired vehicle deceleration being reduced to zero because the lateral acceleration aLat that results from the currently requested steering angle LSoll already corresponds to the maximum total acceleration aTotMax.

Consequently, in the case of an evasive maneuver AWM, a desired vehicle deceleration zSoll is only selected to be of such a value that the vectorial sum of the longitudinal acceleration and lateral acceleration aLat does not exceed the maximum total acceleration aTotmax.

In the case of the evasive maneuver AWM illustrated in FIG. 2a, in the event that the total acceleration aTotMax is achieved, first of all the desired vehicle deceleration zSoll is adjusted and intervention in the steering procedure by means of limiting the desired steering angle LSoll is only performed if the maximum lateral acceleration aLatMax has been exceeded by means of the steering specification. Consequently, the evasive maneuver is awarded a higher priority than the deceleration of the vehicle-trailer combination 100.

The method in accordance with the invention may be performed in accordance with FIG. 3 by way of example as follows:

In an initial step St0, the emergency evasion system 80 is initialized, by way of example by starting the commercial vehicle-trailer combination 100.

In a first step St1, it is subsequently determined by the emergency braking system 40 whether a collision K is impending with a collision object 200 that is directly ahead, in other words whether based on an evaluation of the data from the camera 41 and/or from the radar 42, a driving situation has been detected that with a high degree of probability would lead to a collision K. If this is the case, the emergency evasion control unit 70 of the emergency evasion system 80 subsequently initiates and performs an evasive maneuver AWM.

The following steps St2 to St6 are performed one after the other for each time interval dt until the vehicle-trailer combination 100 is brought to a standstill:

In a second step St2, the current vehicle-x-position xa is read out for the current time interval dt in order to establish whether it is necessary to calculate an evasion trajectory A_i.

If it is necessary to perform a calculation, since the evasive maneuver AWM starts in the current time interval dt or because an intermediate point Zi has been reached, an evasion trajectory AT_i is determined in a third step St3 as above, wherein the initial evasion trajectory AT_0 is determined at the start of the evasive maneuver AWM and the updated evasion trajectory AT_i with i>0 is determined at an intermediate point Zi.

If an evasion trajectory AT_i is determined in the third step St3, the index i for the new calculation is increased in a fourth step St4 by one and based on the number of planned new calculations it is determined after which vehicle-x-position xa the next new calculation is to be performed or rather at which vehicle-x-position said vehicle-trailer combination reaches the next intermediate point Z.i.

If a new evasion trajectory AT_i is not determined in the third step St3, the method jumps directly to a fifth step St5 in which, on the basis of the evasion trajectory AT_i last determined in each case in step St3 with i=0, . . . , N or rather its second derivative f2(xa), the desired steering angle LSoll is determined with which the active steering system 30 is to be controlled in order to follow the respective evasion trajectory A_i within the scope of the evasive maneuver AWM, and the desired vehicle deceleration zSoll is also determined.

Figure 4:
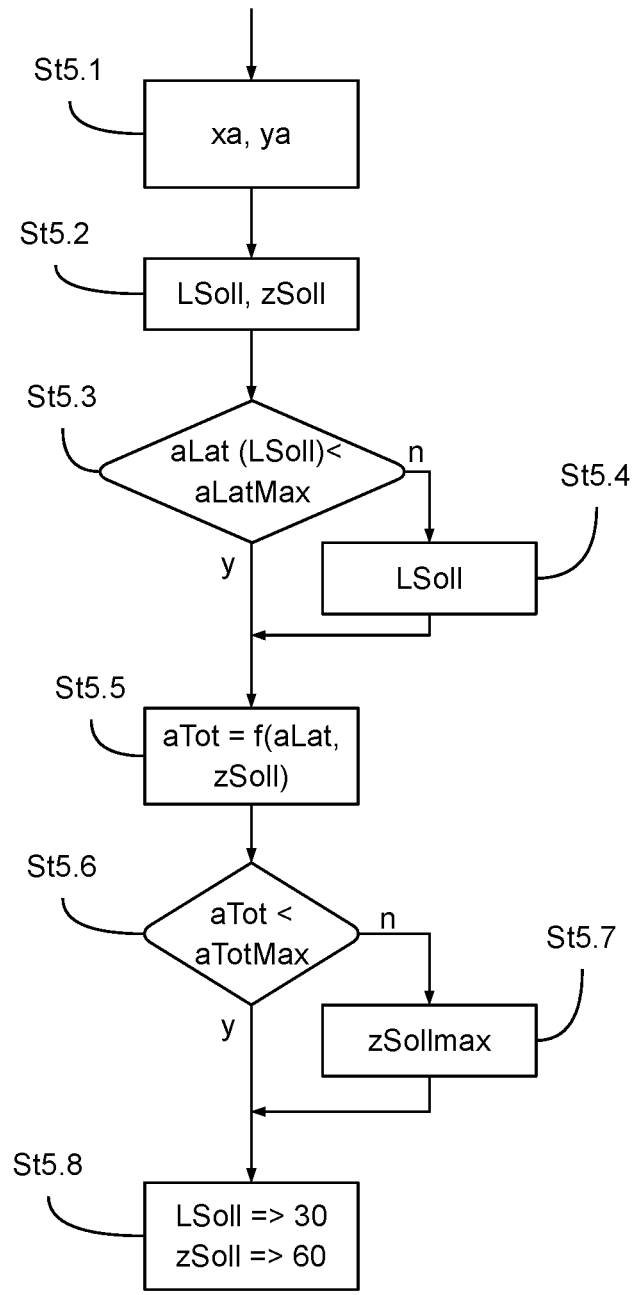

For this purpose, in accordance with FIG. 4, the vehicle-x-position xa is determined for the current time interval in a first intermediate step St5.1 as described above by means odometry.

In a second intermediate step St5.2, based on the second derivative f2(xa) at the vehicle-x-position xa that is determined in the first intermediate step St5.1, the desired steering angle LSoll is determined for the current time internal dt. Moreover, the desired vehicle deceleration zSoll for the current time interval dt is established in such a manner that the commercial vehicle-trailer combination 100 comes to a standstill at the end of the distance to standstill DS, with the result that the commercial vehicle-trailer combination 100 with its vehicle-trailer combination rear side 102 has completely left the evasion distance DA behind it, in other words that the vehicle-trailer rear side 102 also comes to a standstill adjacent to the collision object 200 and consequently the starting traffic lane 300*a* to the rear of the collision object 200 is completely free for the following traffic.

In a third intermediate step St5.3, a check is performed for the current time interval dt as to whether the commercial vehicle-trailer combination 100 is at risk of tipping over on account of the steering angle LSoll that is determined in the second intermediate step St5.2 and the desired steering angle LSoll is limited as described above in a fourth intermediate step St5.4 in the event that the lateral acceleration aLat (f2(xa)) exceeds the maximum lateral acceleration aLatMax for this desired steering angle LSoll.

In order to prevent loss of directional stability as a result of the requested desired vehicle deceleration zSoll as the evasive maneuver AWM is performed, in other words as the vehicle-trailer combination 100 swerves, a total acceleration aTot that is produced on account of the desired vehicle deceleration zSoll that is determined in the second intermediate step St5.2 is determined for the current time interval dt in a fifth intermediate step St5.5 and a check is performed in a sixth intermediate step St5.6 as to whether the total acceleration aTot has achieved or exceeded a maximum total acceleration aTotMax. If this is the case, the desired vehicle deceleration zSoll is limited in a seventh intermediate step St5.7 to the maximum desired vehicle deceleration zSollmax. Since the total acceleration aTot is also dependent upon the desired steering angle LSoll, the braking procedure is consequently awarded a lower priority than the steering procedure.

In an eighth intermediate step St5.8, the desired steering angle LSoll that is limited where necessary is output to the active steering system 30 and the desired vehicle deceleration zSoll that is limited where necessary is output to the electronic braking system 60.

Figure 3:
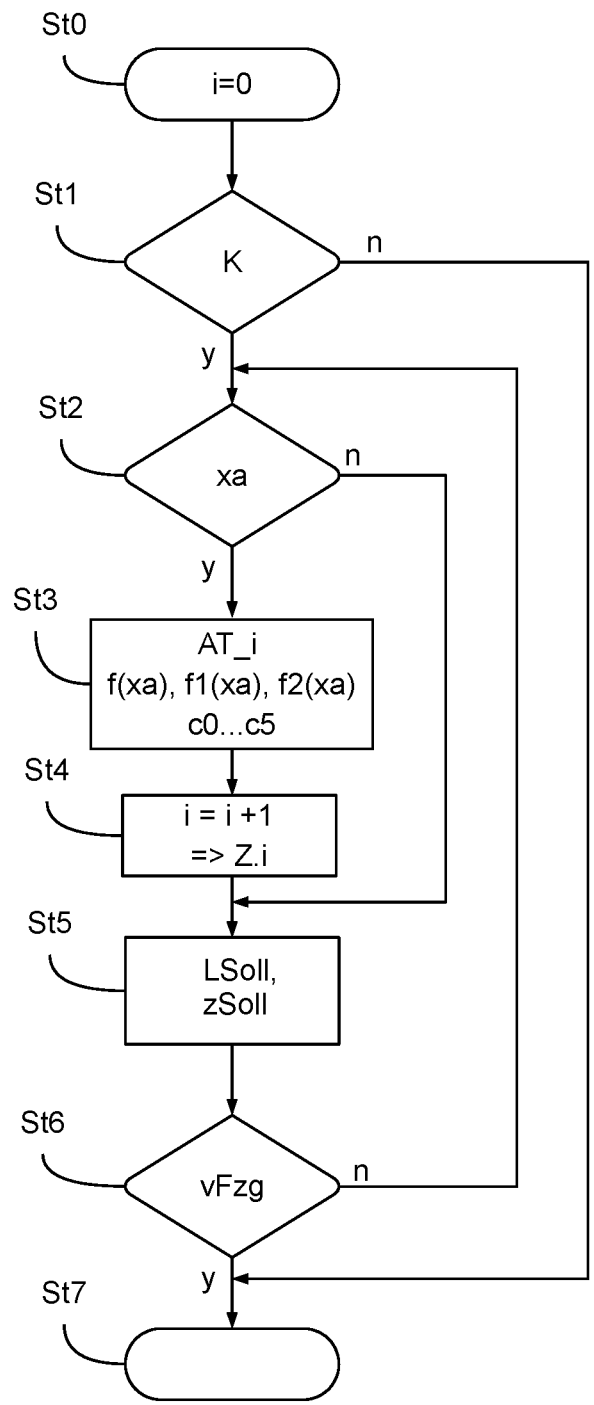
FIGS. 3, 4 illustrate flow diagrams for performing the method in accordance with the invention.

In a sixth step St6, a check is performed in accordance with FIG. 3 as to whether the vehicle velocity vFzg has come to a standstill in this time interval or has achieved a vehicle velocity vFzg that corresponds quasi to being at a standstill. If this is the case, the commercial vehicle-trailer combination 100 comes to a standstill in a seventh step St7 and in so doing is oriented on account of the calculation of the evasion trajectories AT_0, AT_i and also on account of the desired vehicle deceleration zSoll approx. parallel to the target traffic lane 300*b* and does not protrude rearward beyond the collision object 200 with the result that space is created for the following traffic.

If the commercial vehicle-trailer combination 100 does not come to a standstill in the sixth step St6 for this time interval dt, the method jumps back to step St2, from which point the method is repeated for the next time interval dt.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Towing vehicle
20 Trailer
30 Active steering system
40 Emergency braking system (AEBS)
41 Camera
42 Radar
50 Stability control system (ESC)
51 ESC control unit
52 Device for preventing the vehicle-trailer combination from tipping over
60 Electronic braking system (EBS)
61 EBS control unit
70 Emergency evasion control unit
80 Emergency evasion system
90 Satellite navigation system
100 Commercial vehicle-trailer combination
101 Vehicle-trailer combination front side
102 Vehicle-trailer combination rear side
200 Collision object
300*a* Starting traffic lane
300*b* Target traffic lane
Ai Evasion point
aLat Lateral acceleration
aLatMax Maximum lateral acceleration
AT_0 Initial evasion trajectories
AT_i, i>0 Updated evasion trajectories
aTot Total acceleration
aTotMax Maximum total acceleration
ATreal Actual evasion trajectory
AWM Evasive maneuver
B length of vehicle-trailer combination
ci Coefficients of the function f(x)
DA Evasion distance
DS Distance to standstill
dt Time interval
f Factor
f(x) Function
f1(x) First derivative of the function f(x)
f2(x) Second derivative of the function f(x)
fStat Stationary transmission function of the year behavior g Gravitational constant
K Collision
KG Tipping-over limit
LGrad Self-steering behavior
LRatio Total steering ratio
Lreal Actual steering angle progression
LSoll Desired steering angle
LStart Steering angle progression
mue Coefficient of friction
P1 Start point
P2 End point
Q Lateral offset
R Wheel track width
SP Center of gravity of the commercial vehicle-trailer combination 100
T Tolerance
vFzg Vehicle velocity
xa Current vehicle-x-position
xb Previous vehicle-x-position
YawAng_a Current yaw angle
YawAng_b Previous yaw angle
YawRate Yaw rate
ya Current vehicle-y-position
yb Previous vehicle-y-position
Zi Intermediate point
zSoll Desired vehicle deceleration
zSollmax Maximum desired vehicle deceleration

The invention claimed is:

1. A method for performing an evasive maneuver with a commercial vehicle-trailer combination, the method comprising:
   ascertaining that a collision between the commercial vehicle-trailer combination and a collision object is impending, wherein the collision object is spaced apart from the commercial vehicle-trailer combination by an evasion distance;
   determining an evasion trajectory by which the commercial vehicle-trailer combination can evade the collision object without coming into contact with the collision object;
   determining a desired steering angle based on the evasion trajectory and activating an active steering system of the commercial vehicle-trailer combination in dependence on the determined desired steering angle such that the commercial vehicle-trailer combination moves along the evasion trajectory from a starting traffic lane to a target traffic lane so as to perform the evasive maneuver;
   determining a desired vehicle deceleration representing a longitudinal deceleration of the commercial vehicle-trailer combination and initiating an electronic braking system of the commercial vehicle-trailer combination in dependence on the desired vehicle deceleration so as to brake the commercial vehicle-trailer combination while the evasive maneuver is being performed,
   wherein while the evasive maneuver is being performed, a lateral acceleration of the commercial vehicle-trailer combination is determined for the center of gravity of the vehicle-trailer combination,
   wherein the desired steering angle is limited in the event that the lateral acceleration achieves or exceeds a maximum lateral acceleration in order to prevent the vehicle-trailer combination from tipping over,
   wherein the desired vehicle deceleration is limited to a maximum desired vehicle deceleration in the event that a total acceleration of the commercial vehicle-trailer combination achieves or exceeds a maximum total acceleration in order to prevent loss of directional stability or to prevent the commercial vehicle-trailer combination from swerving, wherein the total acceleration is the vectorial sum of a longitudinal and lateral acceleration of the vehicle-trailer combination, and
   wherein the desired vehicle deceleration during the evasive maneuver is selected such that the vehicle-trailer combination with a vehicle-trailer rear side comes to a standstill after achieving the evasion distance.

2. The method as claimed in claim 1, wherein so as to limit the desired vehicle deceleration, the total acceleration is determined from the lateral acceleration and from the desired vehicle deceleration, and the desired vehicle deceleration is limited to the maximum desired vehicle deceleration in the event that the total acceleration achieves or exceeds the maximum total acceleration.

3. The method as claimed in claim 1, wherein so as to limit the desired vehicle deceleration a check is performed as to whether the desired vehicle deceleration achieves or exceeds the maximum desired vehicle deceleration, wherein the maximum desired vehicle deceleration is dependent upon the maximum total acceleration.

4. The method as claimed in claim 1, wherein the maximum desired vehicle deceleration is determined in such a manner that a desired vehicle deceleration may only be requested if the maximum total acceleration is not already achieved or exceeded by the lateral acceleration that results from the currently requested desired steering angle.

5. The method as claimed in claim 1, wherein the maximum total acceleration is dependent upon a coefficient of friction.

6. The method as claimed in claim 1, wherein at the start of the evasive maneuver an initial evasion trajectory is determined, wherein the initial evasion trajectory is established in dependence upon a start point on the starting traffic lane and upon an end point on the target traffic lane.

7. The method as claimed in claim 6, wherein whilst the evasive maneuver is being performed an updated evasion trajectory is determined periodically at defined intermediate points, wherein by means of the updated evasion trajectory deviations of an actual evasion trajectory of the vehicle-trailer combination from the initial evasion trajectory are compensated for.

8. The method as claimed in claim 7, wherein the updated evasion trajectory is determined in dependence upon the intermediate point and upon an evasion point that is associated with the respective intermediate point in such a manner that whilst traveling along the respective updated evasion trajectory the commercial vehicle-trailer combination evades the collision object without coming into contact with the collision object, and
   wherein the updated evasion trajectory is established in such a manner that the updated evasion trajectory lies on the initial evasion trajectory or deviates at a maximum by a tolerance from the initial evasion trajectory starting in the direction away from the collision object toward the target traffic lane.

9. The method as claimed in claim 7, wherein the respective intermediate points are determined in dependence upon a current vehicle-x-position and upon a current vehicle-y-position, wherein the current vehicle-x-position and the current vehicle-y-position are obtained by means of odometry from a previous vehicle-x-position valid prior to a time interval or rather from a previous vehicle-y-position, from the current yaw angle and from the current vehicle velocity.

10. The method as claimed in claim 9, wherein the current yaw angle is obtained using an integration method from a previous yaw angle valid prior to the time interval and the current yaw rate.

11. The method as claimed in claim 9, wherein so as to determine the current vehicle-x-position reference is made to data from a stability control system.

12. The method as claimed in claim 9, wherein the desired steering angle is determined in dependence upon a second derivative of the function of the in each case last calculated initial or updated evasion trajectory at a current vehicle-x-position in the event that the current lateral acceleration does not exceed the maximum lateral acceleration.

13. The method as claimed in claim 7, wherein whilst the evasive maneuver is being performed a selection is made between three and twenty intermediate points at which in each case an updated evasion trajectory is determined.

14. The method as claimed in claim 7, wherein after the commercial vehicle-trailer combination has achieved the evasion distance further evasion trajectories are determined, wherein after achieving the evasion distance the evasion point is maintained so as to orient the vehicle-trailer combination parallel to the target traffic lane.

15. The method as claimed in claim 1, wherein the maximum lateral acceleration is obtained from a tipping-over limit, wherein the tipping-over limit is specified by a device for preventing the vehicle-trailer combination from tipping over and is constant, for example 3 m/s$^2$, or is determined depending upon the vehicle by the device for preventing the vehicle-trailer combination from tipping over.

16. The method as claimed in claim 1, wherein the lateral acceleration is determined in dependence upon a second derivative of the function of the in each case last calculated initial or updated evasion trajectory at a current vehicle-x-position.

17. An emergency evasion system, suitable for performing a method according to claim 1, at least comprising an active steering system, an emergency braking system, a stability control system having a device for preventing the vehicle-trailer combination from tipping over, and also an electronic braking system.

18. A commercial vehicle-trailer combination of a towing vehicle and a trailer having an emergency evasion system as claimed in claim 17.

* * * * *